United States Patent Office 3,664,819
Patented May 23, 1972

---

3,664,819
RESIN BONDED METAL-COATED DIAMOND OR CUBIC BORON NITRIDE ABRASIVE TOOLS CONTAINING AN INORGANIC CRYSTALLINE FILLER AND GRAPHITE
Richard H. Sioui, Holden, and Harvey M. Cohen, Randolph, Mass., assignors to Norton Company, Worcester, Mass.
Filed Nov. 14, 1969, Ser. No. 876,655
Int. Cl. B24b 1/00; C08g 51/12
U.S. Cl. 51—295
10 Claims

ABSTRACT OF THE DISCLOSURE

Organic bonded diamond or cubic boron nitride abrasive tools, showing particular utility in the dry grinding of metal-carbides, and tool steels, respectively, are produced by incorporating graphite, of fine particle size, and a reinforcing filler in the bond, and by employing metal-clad abrasive grits in the amount of 7 to 40%, by volume, of the abrading portion of the tool. The graphite is preferably of a flaky shape having an average diameter of less than 300 microns, and is present in the bond in the amount of from 5 to 40 volume percent, with the total filler content being from 15 to 70%; the remaining filler being, preferably, silicon carbide.

FIELD OF THE INVENTION

This invention relates to organic bonded diamond and cubic boron nitride abrasive tools, such as grinding wheels, for grinding hard materials such as cemented carbides and tool steels.

BACKGROUND OF THE INVENTION

The use of a liquid coolant in the grinding of cemented carbide tools with diamond grinding wheels has been recommended in the past by all diamond wheel makers. Conventional wheels, when used dry, normally show a wheel wear rate of 5 to 6 times that shown when the same wheels are used with a proper liquid coolant for grinding cemented carbides.

Although the patent literature suggests the use of dry-film lubricants of various sorts impregnated into the wheel or compounded with the mix used to make the wheel, such dry lubricants have not been successful in significantly improving the performance of diamond wheels in dry carbide grinding.

Figure 1:
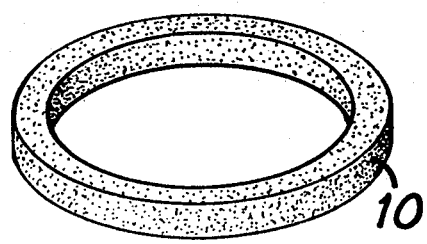
Figure 2:
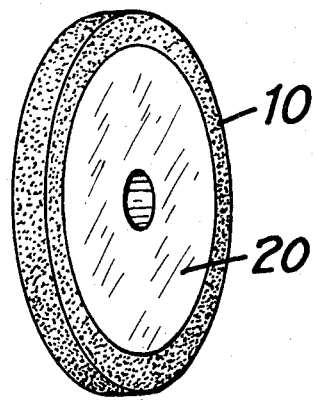
Figure 3:
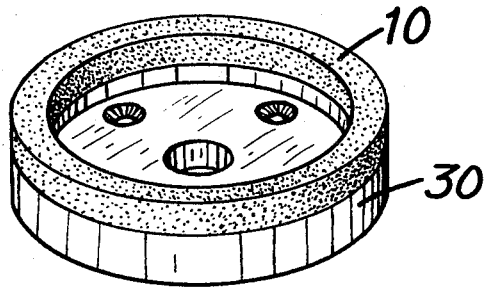

The drawings:
FIG. 1 shows a perspective view of a grinding element such as produced according to the present invention.
FIG. 2 shows a perspective view of the grinding element of FIG. 1 mounted for use.
FIG. 3 shows a different method of mounting the grinding element of FIG. 1.

SUMMARY OF THE INVENTION

We have found that by substitution of graphite, of a highly crystalline form, and of a numerical average particle size less than 300 microns, and preferably between 1 and 50 microns for a portion of the fillers normally employed in the resin bond, diamond or cubic boron nitride grinding tools can be made which perform outstandingly in the dry grinding of hard materials when metal-clad abrasive grits (diamond or boron nitride) are employed. For typical, average, grinding operation we have found that 16%, by volume, of graphite in the bond gives optimum results. Depending upon the particular application, the graphite content must be between 5 and 40%, by volume, in the bond, the preferred range, however, being from 12 to 35%. The bond also contains a reinforcing filler of the type commonly used to reinforce synthetic resins. Such materials are selected from the group of finely divided solid, inorganic, crystalline materials which are chemically stable with respect to the resin, thermally stable at the temperatures to which the tool will be exposed, and which have a strength at least equal to that of the resin. Particularly useful is particulate silicon carbide. But good results can also be achieved with finely divided alumina, zirconia, magnesia, silica, asbestos and metals such as sliver, copper, nickel, cobalt, and iron in a finely divided state. The reinforcing filler should be present in an amount to from 15 to 60 volume percent of the bond.

THE GRAPHITE

Graphite is commercially available in various particle sizes and grades, both natural and synthetic. The graphite should be less than 300 mircons numerical average particle diameter and for best results, in the present invention the average particle size of the graphite should be less than 50 microns, but should not be less than 1 micron. Graphite, as commercially available varies in crystallinity. The more highly crystalline the material is, the better it will perform in the present invention. Highly crystalline graphite tends to be flaky in form, and the flaky shape is preferred. Naturally occurring graphite comminuted to pass through a 325 mesh screen is flaky in form and has been found very satisfactory in the present invention. Best results were achieved with such a material having an average particle size (ignoring thickness of the flakes) of 10 microns. Metal (nickel) coated graphite, as disclosed in U.S. Pat. 3,402,035, may be employed in the present invention, but no advantage has been found in the present invention in having the nickel as a cladding on the graphite as opposed to adding the nickel as an indpendent filler.

THE BOND

The particular bonding resin employed is not critical. Any of the standard resins employed for making grinding wheels are useful. Obviously strength and heat resistance are desirable properties. The well-known cross linked resins such as phenol-aldehyde resins, melamine aldehyde resins, urea-aldehyde resins, polyester resins, and epoxy resins, including the epox-novolacs, may all be used, and conventional modifiers, plasticizers, and fillers may be employed.

Fairly recently new essentially linear polymers as well as thermoset polymers (such as thermoset polymides disclosed in French Pat. 1,455,514) have been introduced which have utility in bonding abrasive grains. These resins, like the cross-linked resins discussed above, are infusible, as opposed to the more common thermoplastic linear polymers having definite softening ranges and which are reversibly softenable. Examples of such resins are given in U.S. Pat. 3,329,489 (polybenzimidazole), and U.S. Pats. 3,295,940 and No. 3,385,684 (polymides). Polysulfide resins such as disclosed in U.S. Pat. 3,303,170 may also be employed.

It will be obvious to those skilled in the art that, other things being equal, best results will be obtained with resins having optimum strength and heat resistance.

THE ABRASIVE

One of the essentials of the present invention is that the abrasive, diamond grit, or cubic boron nitride, have a metal coating encapsulating the abrasive grit such that the metal is present in the coated particle in an amount between 10 and 70%, by volume. Metal coated diamonds of this type are disclosed in Soulard French Pat. 1,142,-688, Belgian Pats. 683,508 and 698,428, and French Pat. 1,522,735. Suitable metal coatings are copper, silver, nickel, cobalt, molybdenum and, in general any metal melting above about 500° F. which is chemically stable in the grinding tool. Although, for wet grinding the volume percent of metal coating can be higher, for dry grinding, to which the tool of the present invention is particularly directed, the volume percent of metal coating should be between 10 to 60%, by volume.

Coated diamonds are commercially available which have nickel coatings within the above range of 10 to 50%, by volume, and copper coatings, within the same range. These coatings can be produced by electrodeposition on a thin, silver coating produced by chemical deposition on the grits. Thus the coatings need not be a single metal, only, and a wide variety of metal coatings are possible and useful in the present invention. Alloys of the metals are also useful.

The grit size of the abrasive is not relevant to the present invention, but grit sizes of 60 through 220 (based on the uncoated grit) are commonly used in diamond wheels.

It is obvious that addition of uncoated abrasive to a wheel containing a major portion of metal coated abrasive would not necessarily deleteriously affect the grinding performance of the wheel. In all cases however, the tools should contain at least 7%, by volume, of metal coated abrasive in which the coating constitutes at least 10%, by volume, of the combined abrasive and coating. The total abrasive content (including metal coating) should not exceed 50%, by volume, of the tool.

THE GRINDING TOOL

Grinding elements according to the present invention may be formed by pressing the mixture in a mold of the desired shape. The mold may be heated and the resin may be completely or partially cured in the mold.

FIG. 1 shows a typical grinding element 10. FIG. 2 shows the grinding element mounted on a core 20 to produce a straight grinding wheel. FIG. 3 shows the element 10 mounted on a cup shaped support to form a grinding wheel commonly referred to as a "cup-wheel." A suitable material for making the support member is an aluminum-filled resin as disclosed in U.S. Pat. 2,150,886. The tool may be molded directly onto the support or may be cemented onto the support after fabrication.

EXAMPLES OF SPECIFIC EMBODIMENTS

Example I

The following mix is typical of a bond suitable for making grinding tools embodying the present invention:

| | Parts, by weight | Parts, by volume |
|---|---|---|
| Powered phenol-aldehyde prysolymer (BRP 5980 available from Union Carbide Corporation) which includes 9% hexamethylene tetremine and to which 10% lime is added | 39.1 | 52.8 |
| Finely divided silicon carbide (800 grit) | 26.0 | 15.0 |
| Natural graphite flake through 325 mesh screen (U.S. Sieve Series) | 30.4 | 25.0 |
| Furfural | 4.5 | 7.2 |

In making a bonded abrasive tool employing the above mix, the abrasive is wet with the furfural and the mixture of bond, filler, and graphite is added and mixing continued to form a homogeneous batch. Sufficient of the mix is then placed in a mold of the desired shape and the mix is hot-pressed to shape. Normally, using the above mix, the tool is then removed from the mold and further cured in an oven. Typical molding conditions are a pressure of 10 tons/1 sq. inch, a temperature of 160° C., and a molding time of 20 minutes. The final cure can be carried out in an air-atmosphere oven for 24 hours at 175° C. Control of the temperature of cure is effective in controlling the hardness or grade of the bond which may differ depending upon the specific application.

Such techniques are well known in the art and form no part of the present invention.

The above example is typical for a bond to be used when the finished tool is to have a relatively high diamond concentration (e.g., for example, from 15 to 40% of the total grinding element volume). Where lower diamond concentration is employed, it is desirable to increase the reinforcing filler content.

The cured abrasive element is attached to a core or holder, as is conventional in the art, to produce a grinding tool such as shown in FIGS. 2 and 3 of the drawing. In the tabulated examples below, cup type wheels were employed of the dimensions and standard shapes indicated. All of the tests were run dry (no liquid coolant).

A series of wheels were prepared to show comparative grinding results in the dry grinding of cemented tungsten carbide. The word ground were standard pieces (5/32" x 1/2") of 44A Carboloy. The wheel was a standard shape 4" cup (Type D6A9) with a 1/8" grinding width. The grinding machine was a surface grinder, the radial speed was 3600 revolutions per minute, the machine traverse rate was 100 inches per minute, and the unit infeed per traverse was 2.0 mils on alternate table reversals. The diamond was 150 grit, coated with either 56 weight percent nickel or 50 weight percent copper. The diamond content in the grinding element was 16% by volume neglecting the volume occupied by the metal coat. The bond in the control wheels was that of Example I, except that no graphite filler was used and the silicon carbide content was increased to 35 volume percent of the bond. The test wheels were made with the bond composition of Example I. Table I gives the results of the comparative grinding test, and shows the advantages of the present invention in terms of power drawn (measured by a watt meter in the circuit of the motor driving the grinding wheels), and in terms of grinding ratio. The grinding ratio is the ratio of the volume of carbide removed to the valume of wheel wear. The significance of the grinding ratio is, obviously, that a wheel with a grinding ratio of 100 will grind ten times as many parts before being worn out as will a wheel with a grinding ratio of 10. It is desirable that the power drawn be as low as possible to avoid heat damage to the work and the wheel. In addition there is, of course, a limit to the power which can be drawn by any given motor. Thus, a standard 1½ horsepower motor would be inadequate for the power drawn in Table I for the standard wheels, but would be adequate for use with the test wheels.

TABLE I

| | Diamond coating | Grinding ratio | Power (watts) |
|---|---|---|---|
| Standard wheel | Ni | 72.2 | 235 |
| Test wheel (Example II) | Ni | 321.0 | 865 |
| Standard wheel | Cu | 36.2 | 1,200 |
| Test wheel (Example III) | Cu | 444.0 | 840 |

Table II shows grinding results on a different cemented tungsten carbide for a standard wheel and for a test wheel of this invention. The standard wheels were the same as the standard wheels of Table I. The test wheels contained the same amount of diamond and graphite as in Table I, but the silicon carbide content was 5% less. The other test conditions were the same:

TABLE II

| | Grinding ratio | Power |
|---|---|---|
| Standard wheel | 51.3 | 1,015 |
| Test wheel (Example IV) | 133.0 | 770 |

To show the importance of the use of metal-clad abrasive, Table III A, shows a comparison of a standard wheel (no graphite) containing uncoated diamond, and a wheel with 7.5% graphite in the bond, and using uncoated diamond. The bonds of both wheels had a total filler level of 35% by volume. These wheels were 5" diameter 11V9 flaring cups with 1/8" wide rims. Although some reduction in power is achieved, no significant increase in grinding ratio was found. Table III-B, however, shows a significant increase in grinding ratio when nickel coated diamonds are substituted for the uncoated diamonds of Table III-A. The increase in grinding ratio was only 9.5% with uncoated diamond, while the increase for nickel coated diamond was 27.4%. The diamond content in all wheels of Table III was 17%, by volume. The other test conditions were the same.

TABLE III A

|  | Grinding ratio | Power |
|---|---|---|
| Standard wheel | 28.4 | 1,325 |
| Test wheel (Example V) | 31.4 | 1,215 |

TABLE III B

|  | Grinding ratio | Power |
|---|---|---|
| Standard wheel | 50.0 | 1,425 |
| Test wheel (Example VI) | 63.7 | 1,425 |

In order to show the advantage of the present invention in wheels employing cubic boron nitride, instead of diamond, in the abrasive section, wheels with compositions similar to Table I were produced, except that in all cases cubic boron nitride of the same grit size was substituted for the diamond, and two standard tool steels T15 and M3 were ground. The cubic boron nitride had a 50%, by weight, nickel coat. The wheels were 3¾" diameter 11V9 flaring cups with ⅛" wide rims. The work ground were ¼ x ½" pieces of the given tool steels. Otherwise the conditions in the test of Table I were employed. The results are reported in Table IV.

TABLE IV

| Steel | T15 | | M3 | |
|---|---|---|---|---|
|  | Grinding ratio | Power | Grinding ratio | Power |
| Standard wheel | 19 | 850 | 39 | 650 |
| Test wheel (Example VI) | 27 | 715 | 44 | 640 |

In order to show the utility of other fillers than silicon carbide, a standard 4" 6A9 wheel, as in Table I, was compared with a similar wheel containing 15% by volume, of graphite, in the bond, and 11.6% of nickel powder. Both wheels contained 16%, by volume, of nickel coated diamond, 150 grit. The graphite was natural flake graphite finer than 325 mesh (U.S. Sieve).

The grinding conditions were as reported in relation to Table I, but a harder carbide sample was ground. The results are given in Table V.

TABLE V

|  | Grinding ratio | Power |
|---|---|---|
| Standard wheel | 77.5 | 1,150 |
| Test wheel (Example VII) | 94.8 | 790 |

What is claimed is:

1. A bonded abrasive element consisting of abrasive grits of metal coated diamond or metal coated boron nitride in the cubic crystal form, and an infusible organic bond selected from the group consisting of phenol-aldehyde resins, polyester resins, epoxy resins, polybenzimidazole resins, polyimide resins and polysulfide resins, said bond including a total filler content of from 15% to 70%, by volume, said filler including a finely divided crystalline inorganic reinforcing filler selected from the group consisting of silicon carbide, alumina, zirconia, magnesia, silica, asbestos, silver, copper, nickel, cobalt, and iron and particulate graphite, said graphite having a particle size of 300 microns or less in its major dimension and being present to the extent of from 5 to 40%, by volume, based on the total volume of the bond, said abrasive particles being distributed through and bonded by said organic bond.

2. An abrasive element as in claim 8 in which the reinforcing filler is silicon carbide.

3. An abrasive element as in claim 1 in which the reinforcing filler is selected from the group consisting of silver, copper, aluminum, iron, nickel, and cobalt.

4. An abrasive element as in claim 1 in which the abrasive constitutes from 7 to 40%, by volume, of the element.

5. An abrasive element as in claim 4 in which the graphite is flaky in shape and capable of passing through a 325 mesh screen.

6. An abrasive element as in claim 5 in which at least 7% by volume of the abrasive grains have a metal coating in the amount of from 10 to 70%, by volume, based on the total volume of the coated particle.

7. An abrasive element as in claim 6 in which the metal coating is nickel or copper.

8. A bonded abrasive element consisting of abrasive grits of metal coated diamond or metal coated boron nitride in the cubic crystal form, and an infusible organic bond selected from the group consisting of phenol-aldehyde resins, polyester resins, epoxy resins, polybenzimidazole resins, polyimide resins, and polysulfide resins, said bond including a total filler content of from 15% to 70%, by volume, said filler including a finely divided inorganic crystalline reinforcing filler which is chemically stable with respect to the resin, thermally stable at the temperature to which the wheel is exposed, and having a strength at least equal to that of the resin and particulate graphite, said graphite having a particle size of 300 microns or less in its major dimension and being present to the extent of from 12 to 35%, by volume, based on the total volume of the bond, said abrasive particles being distributed through and bonded by said organic bond.

9. An abrasive element as in claim 8 in which the reinforcing filler is selected from the group consisting of silver, copper, aluminum, iron, nickel, and cobalt, and the graphite particle size is below 50 microns.

10. An element as in claim 9 in which the average size of the graphite is 10 microns.

References Cited

UNITED STATES PATENTS

| 3,321,287 | 5/1967 | Hunsberger et al. | 51—295 |
| 3,402,035 | 9/1968 | Martin | 51—295 |
| 3,518,068 | 6/1970 | Gillis | 51—295 |
| 3,520,667 | 7/1970 | Taylor | 51—295 |
| 3,528,788 | 9/1970 | Seal | 51—309 |
| 3,528,789 | 9/1970 | Mathewson | 51—295 |
| 3,494,884 | 2/1970 | Kraft | 51—298 |

DONALD J. ARNOLD, Primary Examiner

U.S. Cl. X.R.

51—298